(12) United States Patent
Chênes

(10) Patent No.: US 6,888,898 B1
(45) Date of Patent: May 3, 2005

(54) RANDOM CODE FOR DEVICE IDENTIFICATION

(75) Inventor: Pierre H. Chênes, Ferreyres (CH)

(73) Assignee: Logitech Europe S.A., Romanel-Sur-Morges (CH)

( * ) Notice: Subject to any disclaimer, the term of this patent is extended or adjusted under 35 U.S.C. 154(b) by 0 days.

(21) Appl. No.: 09/580,932

(22) Filed: May 25, 2000

(51) Int. Cl.[7] .................. H04L 5/16; H04L 27/20
(52) U.S. Cl. .................. 375/295; 375/219; 375/316
(58) Field of Search .................. 708/250; 327/100; 331/78; 375/130, 146, 147, 219, 295–315, 316–352; 341/22; 340/825.54

(56) References Cited

U.S. PATENT DOCUMENTS 5,189,543 A * 2/1993 Lin et al. .................. 398/106
5,481,265 A * 1/1996 Russell .................. 341/22
5,883,582 A * 3/1999 Bowers et al. .............. 340/10.2

* cited by examiner

Primary Examiner—Chieh M. Fan
Assistant Examiner—Jason M. Perilla
(74) Attorney, Agent, or Firm—Fenwick & West LLP (57) ABSTRACT

A random identifier code is generated. The random identifier code is for allowing an electrical circuit to be communicatively associated with a particular external entity. The generated random identifier code is derived from signal data produced by the circuit. In the context of a wireless communication system, a transmitter and receiver can be associated with one another by such a random identifier code. Transmissions of the transmitter can be identified based on the random identifier code. No additional memory module needs to be installed during the manufacturing process for storing a predefined code. Once a random code identifier is generated, the associated circuit-external entity pair (e.g., transmitter-receiver pair) can continue to use that code indefinitely. However, a new code can be generated at any given time if so desired.

28 Claims, 6 Drawing Sheets

RANDOM CODE FOR DEVICE IDENTIFICATION

BACKGROUND OF THE INVENTION

1. Field of the Invention

The invention relates to an identification technique that allows an electrical circuit to be communicatively associated with a particular external entity using a random identifier code that is derived from signal data produced by the circuit.

2. Description of the Related Art

In wired communications, a sending device (such as a mouse or keyboard) is cabled to its corresponding receiver. The receiver receives data from the sending device via the cable or other physical interface means, and communicates that data to its intended destination (such as to a computer motherboard). Thus, the communicated data is generally only reported to its intended destination. However, in wireless communications, there is no physical connection between the sending device and the receiving device. Commonly, in any given work area where wireless communications are taking place, there can be multiple transmitter-receiver pairs. In such a work area, any one receiving device can receive multiple transmissions from a number of sending devices. Various techniques have evolved to deal with such a signal rich environment to ensure that each transmitted signal is received by the intended receiver.

One such technique is to simply allow the transmitted signals to be received by multiple receivers that are present in the environment. So long as the transmitted signal is received by the correct receiver, the wireless communication will be effective. However, it is possible that other receivers in the environment that also receive the transmitted signal may erroneously report that signal. For example, consider two wireless mouse-receiver pairs employing this technique, one pair operating at a first workstation and the second pair operating at a nearby second workstation. It is possible that the mouse of the first workstation will be able to control the cursor of the second workstation because the receiver of the second workstation cannot tell the difference between the transmissions of its own mouse and the transmissions of the first workstation's mouse. Thus, this technique may be undesirable, for example, because of the general interference as well as security issues (e.g., remotely controlling the local cursor) associated with multiple transmitter-receiver pairs.

Another technique to ensure that each transmitted signal is received by the appropriate receiver involves establishing an identifier that is associated with any one receiver-transmitter pair. This technique reduces the likelihood of interference and security risks associated with the technique previously described. The identifier is embedded in the signal transmitted from the sending device. Such an identifier, for example, may be a multiple bit code. The corresponding receiving device will only accept, report on, or otherwise react to received signals containing the correct identifier code. Signals received by the receiving device that do not contain the appropriate identifier code are ignored. Thus, there is no erroneous reporting by the receiving device. However, this technique requires that a predefined identifier be stored in the transmitting device.

More specifically, a read-only memory (ROM) type device (e.g., electronically erasable programmable ROM or EEPROM) is used for storing the predefined identifier. For instance, during the manufacturing process of the transmitter-receiver pair, a predefined identifier code is programmed into the EEPROM. The predefined identifier code will then be available when the sending device transmits data. This EEPROM adds substantial cost (e.g., approximately 30 cents per unit) due to the EEPROM itself, the manufacturing process involved in placing and programming the EEPROM, and the physical space consumed by the EEPROM.

What is needed, therefore, is a technique that allows for a transmitter and receiver to be associated with one another by an identifying code. The technique should not require an additional memory module (such as an EEPROM) to be installed during the manufacturing process for storing a pre-assigned identifying code. Additionally, the technique should assign identifier codes to transmitter-receiver pairs in a random fashion.

BRIEF SUMMARY OF THE INVENTION(S)

An identification technique that allows an electrical circuit to be communicatively associated with a particular external entity using a random identifier code that is derived from signal data produced by the circuit. For example, in the context of a wireless communication system, a transmitter and receiver can be associated by a random identifier code generated upon the initial power up of the system. The resulting random identifier code is assigned the to corresponding transmitter-receiver pair, and can be used indefinitely. As such, no additional memory module needs to be installed during the manufacturing process for storing a predefined identifying code.

Generally, the components that comprise a circuit are associated with various tolerances. As such, signal data generated by a circuit (e.g., desired signals and noise signals) are also associated with tolerances. The signal data produced by any one circuit having a set of tolerances may be consistent and predictable given a consistent and predictable input stimulus is applied to that circuit. However, this predictability is unique to the particular circuit. A duplicate circuit, although similarly designed, is associated with its own set of tolerances that are derived from the specific components that comprise that circuit. Such a duplicate circuit can provide signal data that varies significantly from the signal data of the other circuit, notwithstanding external factors such as input stimulus and environment conditions remaining constant. Thus, signal predictability between duplicate circuits is dependent, for example, on individual component tolerances as well as the number of components that comprise the circuit.

Individual component tolerances associated with a circuit, when taken in the aggregate, provide a sophisticated string of variables. The more components that comprise the circuit, the longer and more sophisticated the string of variables becomes. This string of variables renders the predictability of one circuit's generated signal data based on a duplicate circuit's generated signal data improbable. Inherent in this lack of predictability is a quality of randomness. In one sense, the lack of predictability is predictable or ensured. In another sense, the randomness is predictable or ensured. With these precepts in mind, it is possible to generate a random identifier code for distinguishing the output signals or work product of one circuit from the output signals or work product of another, yet duplicate circuit. The circuit itself (or some portions thereof) can be used to generate the random identifier code thereby reducing related efforts and componentry from the manufacturing process.

For example, consider a wireless transmitter-receiver pair (e.g., a wireless mouse and a corresponding receiver unit). Typically, a wireless transmitter includes a microcontroller unit (MCU) or equivalent processing environment. The MCU may include a multipurpose timer, and may have one of its I/O ports coupled to a resistor-capacitor (RC) circuit having a known time constant. A random identifier code can be obtained by reading the output value of the multipurpose timer when the RC circuit has charged (or discharged) for a set time period, or when it has charged to a certain threshold. The timer may rollover multiple times before this RC circuit threshold voltage is achieved. Tolerances on parameters such as the threshold voltage, the time period for the RC circuit to reach the threshold voltage, the rollover period of the counter, the actual resistor and capacitor values of the RC circuit, and the noise on the MCU I/O port coupled to the RC circuit all contribute to the randomness of the random identifier code eventually selected and assigned to the wireless transmitter-receiver pair. It is highly improbable that another wireless transmitter-receiver pair (having an identical design specification, but being comprised of different componentry) located in the same work area would generate the same random identifier code.

In another exemplar embodiment, a software routine running on a transmitting device's MCU can be used to interrogate various data points in the transmitting device at in response to a code generating event. For instance, the routine could measure voltage levels at specified test points, or the amount of time it takes for a test point to reach a specified voltage level. Such random data points can be applied to an algorithm that would then generate a random identifier code. Thus, no additional circuitry would have to be added to the device for purpose of generating a random identifier code to facilitate communication between the transmitter and its intended receiver.

The technique provided can be implemented in any wireless transmitter-receiver pair (e.g., mouse, keyboard, video camera, personal digital assistant, pointing device, remote control, etc). The transmitter-receiver pair may be included in a transceiver-transceiver pair. The technique provided can also be implemented in any situation where a circuit is physically interfaced to an external entity, for the purpose of forming an association between that circuit and external entity. Once a random code device identifier is generated, the associated transmitter-receiver pair (or circuit-external entity pair) can continue to use that code indefinitely. However, a new code can be generated at any given time if so desired.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4b illustrates an exemplar RC load curve of the exemplar system shown in FIG. 4a.

DETAILED DESCRIPTION OF THE INVENTION(S)

Figure 1:
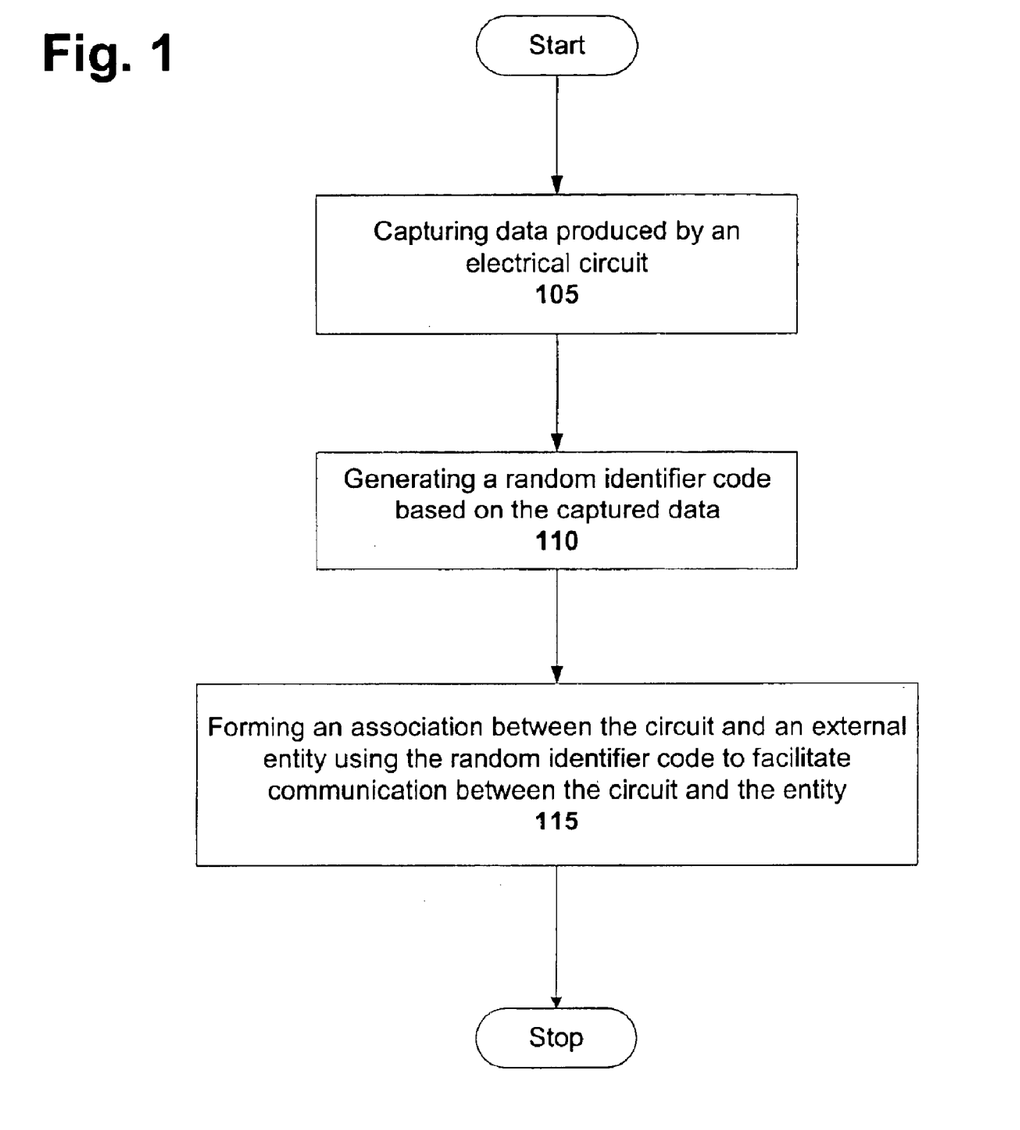
FIG. 1 is a general flow diagram illustrating the generation and use of a random identifier code in accordance with one embodiment of the present invention.

FIG. 1 is a general flow diagram illustrating the generation and use of a random identifier code in accordance with one embodiment of the present invention. This method can be implemented where it is desirable to associate electrical circuitry with a specific entity external to the circuit. For example, consider a testing environment where a test adapter may be interfaced to any one of several identical test bays of a test station for performance testing a particular product. The test adapter physically interfaces with a bay of the test station (e.g., via a conventional PANDUIT interface connector), and the product under test is received into a socket of the test adapter. In this example, therefore, the test adapter adapts the product to a bay of the test station so performance testing of the product can be carried out. If the adapter were calibrated for only one of the available bays on the test station, it would be desirable to associate the adapter with that particular test bay only. Such an association could be used to prevent the adapter from being used on a bay that it is not calibrated on thereby preventing erroneous performance test results.

The method of FIG. 1 begins by capturing 105 data produced by an electrical circuit. In the context of the above example, this might include capturing the voltage level at various test points in the adapter circuitry upon completion of its calibration on a particular test bay. The method continues with generating 110 a random identifier code based on the captured data produced by the electrical circuit. For example, the voltage levels captured at various test points in the adapter circuitry could be applied to an algorithm to seed the generation of a random identifier code. Alternatively, the captured voltage levels could simply be left in their raw form with no further processing. Regardless of how the captured data is processed, what is significant here is the improbability that the random identifier code generated from the captured data of any one test adapter-test bay pair will be the same as random identifier code produced by another test adapter-test bay pair. As such, one electrical circuit (e.g., a first test adapter) can be distinguished from another electrical circuit (e.g., a second test adapter of identical design to the first test adapter, but comprised of different componentry) based on random identifier codes.

The method further includes forming 115 an association between the circuit and an external entity using the random identifier code to facilitate communication between the circuit and the entity. For example and with reference to the above test environment example, the random identifier code generated could be communicated to the corresponding test bay and stored in a memory coupled thereto. Thus, the association between the circuit (e.g., the adapter circuitry) and the external entity (e.g., the corresponding test bay) can be confirmed at a later time. In this sense, the circuit and the external entity are associated or "married" to each other and form a circuit-external entity pair where the external entity can recognize the circuit whenever the two are coupled together. If the random identifier code of a particular test adapter is not reflected in the memory coupled to a particular test bay, then that adapter has not been calibrated for use on that bay. Accordingly, a message indicating such can be communicated to the test person thereby preventing a non-calibrated performance testing of a product.

In one embodiment, the confirmation of the association between the circuit and the external entity can be achieved by re-capturing the circuit data, re-generating the resulting identifier code, and comparing it to the identifier code stored in the memory of the corresponding test bay. This embodiment assumes that the same circuit components will tend to generate the same random identifier code (allowing for some acceptable variation or tolerance) given that external stimulus remain consistent. This embodiment further assumes that a circuit comprised of one set of circuit components will tend to generate random identifier codes that are different than codes generated by a circuit comprised of another set of circuit components, although the circuits are assembled according to the same design.

In an alternative embodiment, the confirmation of the association between the circuit and the external entity can be achieved by storing the initial generated random identifier code in the circuit as well as in a memory coupled to the external entity. The identifier code can be stored in a MCU, for example, that is included in the circuit. As such, the respective stored identifier codes can be compared to confirm the association between the circuit and the external entity. Thus, no additional memory module is necessary to store a predefined code. This embodiment may be desirable, for example, where the steps of capturing 105 and or generating 110 for any one circuit do not tend to generate the same random identifier code given that external stimulus remain constant.

Figure 2:
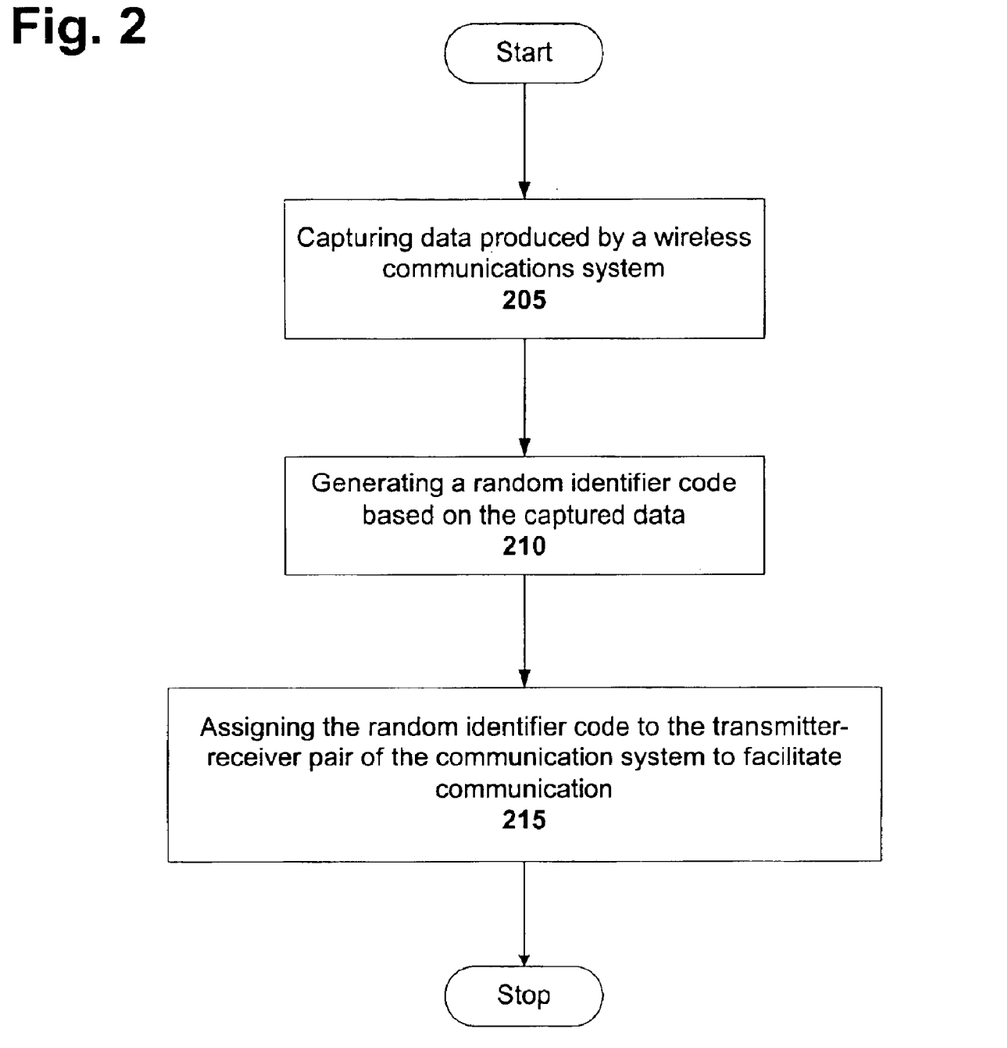
FIG. 2 is a flow diagram illustrating the generation and use of a random identifier code within a wireless communications system in accordance with one embodiment of the present invention.

FIG. 2 is a flow diagram illustrating the generation and use of a random identifier code within a wireless communications system in accordance with one embodiment of the present invention. The method begins by capturing 205 data produced by a wireless communications system. The wireless communications system may be comprised of, for example, a wireless transmitter-receiver pair such as a wireless mouse and a corresponding receiver unit. However, those skilled in the art will recognize that any wireless-type transmitter-receiver pair can be represented here. For example, other exemplar transmitter-receiver pairs might be comprised of a keyboard, trackball, joystick, video camera, personal digital assistant, pointing device, or remote control along with their respective receiver units. Additionally, the transmitter-receiver pair may be included in, for example, a transceiver-transceiver pair or any combination of devices that, when taken as a whole, possess the ability to transmit and receive signals via wireless communication technology.

The captured data can be produced solely by the transmitter. However, the captured data may also be produced solely by the receiver or by a combination of the receiver and the transmitter. The source of the captured data, therefore, is not necessarily significant. What is significant, however, is that the captured data is associated with incertitude. This incertitude can manifest, for example, at the individual data point level, or when a number of captured data is considered as a whole. The data captured can be, for example, a dynamic data point produced in response to a number of other events occurring in the communication system, or can be a single data point. In one embodiment, a software routine running on an MCU of the transmitting device is used to interrogate various random data points in the transmitting device at power-up. This interrogation process produces a number of data points having the requisite incertitude.

The method continues with generating 210 a random identifier code based on the captured data produced by the communication system. In one embodiment, the captured data captured is applied to an algorithm (e.g., embedded in an MCU or equivalent processing environment of the transmitter) to seed the generation of a random identifier code. Thus, no additional circuitry would have to be added to the transmitter-receiver pair for the purpose of generating a random identifier code. Alternatively, the captured data could simply be left in its raw form and used as the random identifier code. Regardless of how the captured data is processed, what is significant here is the improbability that the random identifier code generated from the captured data of any one receiver-transmitter pair will be the same as a random identifier code produced by another receiver-transmitter pair. As such, transmissions of one transmitting device (e.g., a first wireless mouse) can be distinguished from transmissions of another transmitting device (e.g., a second wireless mouse of identical design to the first wireless mouse, but comprised of different componentry) based on random identifier codes.

The method further includes assigning 215 the random identifier code to the corresponding transmitter-receiver pair to facilitate communication between the transmitter and the receiver. In one embodiment, the random identifier code generated is communicated to the corresponding receiver and stored in a memory included within the receiver. Additionally, the random identifier code generated can be stored in an MCU of the transmitter. Local power (e.g., such as battery power of the transmitter or line power of the receiver) can be used to maintain the storage of this identifier code. The random identifier code can then be embedded in transmissions from the transmitter to the receiver. Thus, a proper association between the transmitter and the receiver can be confirmed. Hence, the transmitter and receiver are married to one another and form a transmitter-receiver pair. If the receiver receives a transmission that does not include the proper random identifier code, then the receiver will not report on or otherwise react to that transmission.

Figure 3:
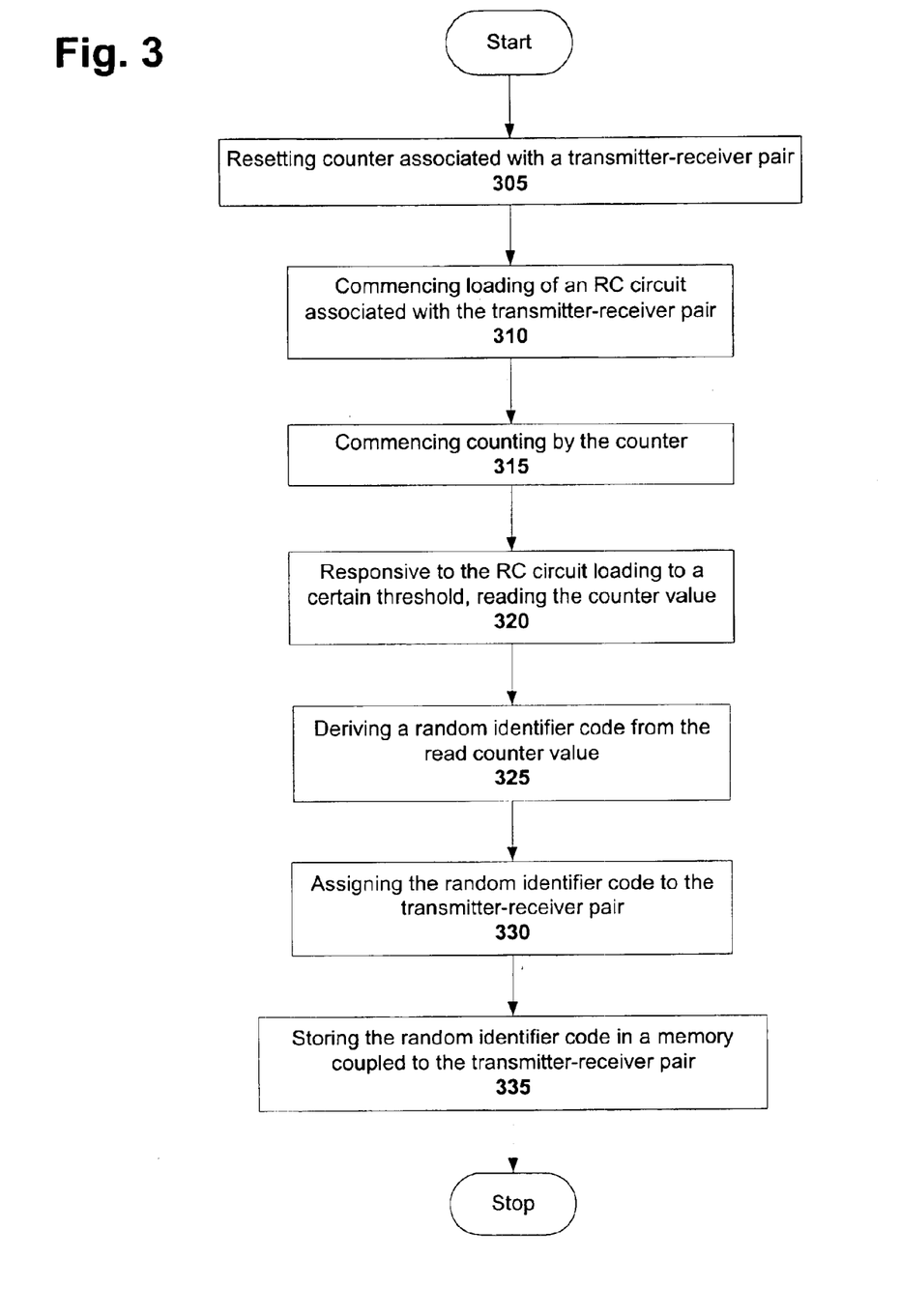
FIG. 3 is a detailed a flow diagram illustrating the generation and use of a random identifier code within a wireless communications system in accordance with one embodiment of the present invention.

FIG. 3 is a detailed flow diagram illustrating the generation and use of a random identifier code within a wireless communications system in accordance with one embodiment of the present invention. The method may begin by resetting 305 a counter associated with a transmitter-receiver pair of the communication system. In one embodiment, the counter is multifunction N-bit timer included in a MCU (or equivalent processing environment) of the transmitter. For example, the timer may be a 16-bit timer included in the MCU design. Alternatively, the timer can be external to the processing environment.

The method also includes commencing 310 the loading of an RC circuit associated with the transmitter-receiver pair. In one embodiment, this RC circuit is coupled to an I/O port of the MCU or processing environment of the transmitter. The I/O port can be set to a low voltage state thereby causing the RC circuit to unload or discharge (e.g., to the ground potential). Conversely, the I/O port can be set to a high impedance state thereby causing the RC circuit to load or charge (e.g., to a supply potential such as Vcc). The state of the I/O port can be controlled, for instance, by a software routine running in the MCU or by hardware such a switch. This commencing 310 of loading the RC circuit can be preceded by the unloading of the RC circuit to establish timing and voltage references. For example, $t_0$ can be defined at the point when the RC load voltage is at approximately 0 volts.

The method further includes commencing 315 counting by the counter. In one embodiment, steps 310 and 315 can begin simultaneously (e.g., at $t_0$). Alternatively, the loading of step 310 can occur independently of the counting of step 315. Regardless, of the manner in which steps 310 and 315 are carried out, it is improbable that a circuit of identical design (but comprised of physically different components) will produce the same results given a common scheme of operation among the circuits. Responsive to the RC circuit loading to a certain threshold voltage, the method continues with reading 320 the counter value. The rollover period of the counter (e.g., an 8-bit timer having a 4 microsecond resolution has a rollover period of approximately 1.024 milliseconds) can be significantly less than the time it takes the RC circuit to load from $t_0$ to the threshold voltage. As such, the counter will roll over a number of times before the RC circuit loads from $t_0$ to the threshold voltage.

In the embodiment described above, the incertitude of the counter value read in step 320 is derived from several factors. For example, the tolerance associated with the RC circuit threshold voltage, the tolerances associated with the resistor and capacitor of the RC circuit, the rollover period of the counter, and the noise on the I/O port of the MCU. This incertitude provides the basis for the randomness of the counter value that is ultimately read in step 320. Thus, this counter value can be used as a random identifier code. Alternatively, the method can include deriving 325 a random identifier code from the counter value by, for instance, seeding a random code generator with the counter value.

Regardless of whether the counter value read in step 320 is used directly as a random identifier code, or is used to derive a random identifier code, the method includes assigning 330 the resulting random identifier code to the transmitter-receiver pair of the communication system. As such, the transmitter will be associated or married with the receiver. The method may further include storing 335 the resulting random identifier code in a memory coupled to the transmitter-receiver pair. In one embodiment, for example, the resulting random identifier code is stored in both the transmitter (e.g., in the transmitter MCU) and in the receiver (e.g., in the receiver MCU). In this embodiment, the resulting identifier code can be embedded in the signals transmitted from the transmitter to the receiver thereby distinguishing those signals from noise signals. As such, the receiver will report only on signals including the proper random identifier code.

Figure 4A:
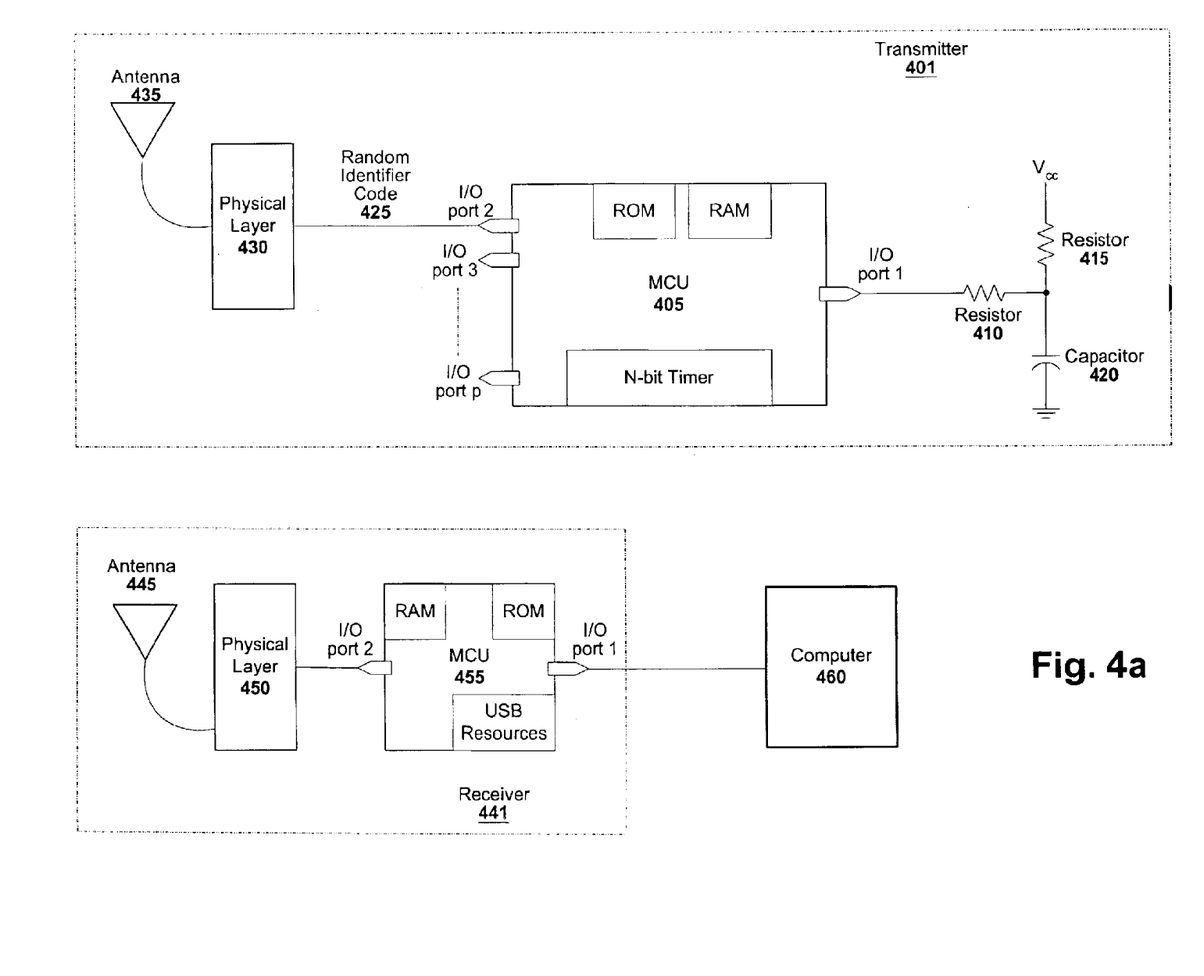
FIG. 4a illustrates an exemplar system in which a random identifier code can be generated and used in accordance with one embodiment of the present invention.

FIG. 4a illustrates an exemplar system in which a random identifier code can be generated and used in accordance with one embodiment of the present invention. This exemplar system is comprised of a transmitter 401, a receiver 441 and a computer 460. In one embodiment, the transmitter 401 could be included in a wireless mouse, where receiver 441 (e.g., included in a receiver unit) would receive the wireless transmissions from the transmitter 401 of the mouse. Receiver 441 would then report the received mouse data to the computer 460 via, for example, a universal serial bus (USB) or a PS/2 port. Those skilled in the art, however, will recognize that the transmitter-receiver pair comprised of transmitter 401 and receiver 441 can be implemented in any one of a number of wireless communication systems such as a keyboard-receiver pair, a personal digital assistant pair, a trackball-receiver pair, a joystick-receiver pair, a video camera-receiver pair, or a remote control-receiver pair just to name a few.

Additionally, transmitter 401 may be part of a transceiver, just as receiver 441 may be. For example, a wireless device (e.g., a wireless mouse or keyboard) can include a transceiver, just as a corresponding receiver unit can include a transceiver. As such, a random identifier code could be generated in receiver 441 (e.g., included in the transceiver of a receiver unit), transmitted to the transmitter 401 (e.g., included in the transceiver of a wireless mouse or keyboard), and then be used to identify transmissions of transmitter 401.

In the embodiment shown, transmitter 401 is comprised of an MCU 405, a physical layer 430, an antenna 435 and an RC network including resistors 410 and 415 and capacitor 420. The RC network is coupled to I/O port 1 of MCU 405. A random identifier code 425 generated by MCU 405 is output at I/O port 2, and is applied to physical layer 430. Physical layer 430 is coupled antenna 435. MCU 405 is comprised of a random access memory (RAM), a read only memory (ROM), a N-bit timer (e.g., 16-bit) and a number of I/O ports (e.g., eight I/O ports), although other support functions can be included as well. Those skilled in the art understand that a MCU is a reliable and highly definable component that can perform such functions as receive data, manipulate data, execute instructions that act on data, monitor system parameters, and generally control an overall process. Other equivalent environments suitable for running a real-time process can be used in place of an MCU.

Receiver 441, on the other hand, is comprised of an MCU 455, physical layer 450 and an antenna 445. Computer 460 is coupled to MCU 455 by I/O port 1, and physical layer 450 is coupled to I/O port 2 of MCU 455. Antenna 445 is coupled to physical layer 450. MCU 455 is comprised of a RAM, a ROM, USB resources and a number of I/O ports (e.g., sixteen I/O ports). Other configurations of MCU 455 can also be used. For example, MCU 455 may include PS/2 resources rather than USB resources. The above discussion regarding MCU 405 equally applies to MCU 455.

Generating the Random Identifier Code

The code generating event that triggers the generation of random identifier code 425 can be any one of a number of events, or a combination of events. For example, a primary event can trigger or start the initial process of generating random identifier code 425. A secondary event can then, for example, trigger the reading of an output value of a circuit, chip or electronic device. This output value can be used as the random identifier code, or can be used to seed a random identifier code algorithm that generates the random identifier code. Regardless of the triggering events used, a process running on MCU 405 can be used to generate a random identifier code 425 in response to those triggering events occurring. That process can be carried out, for instance, by a software program or set of instructions stored in the ROM of MCU 405.

For example, and with reference to the embodiment shown, a program stored in the ROM of MCU 405 might perform the following process. A primary code generating event such as power up (or other primary code generating event) can be used to initiate the process. Responsive to that code generating event occurring, commanding I/O port 1 from a high impedance state to a low voltage state. As such, capacitor 420 unloads (discharges) through resistor 410 to the virtual ground created by the low voltage state. The time constant of the discharge is approximately equal to the product of resistor 410 and capacitor 420. For discussion purposes, assume the following values: resistor 415 equals 1 Megaohm, resistor 410 equals 470 ohms and capacitor 420 equals 220 nanofarads. The time constant of the discharge would therefore be approximately 103.4 microseconds. While capacitor 420 is discharging, the program running in MCU can employ a delay routine that is slightly longer than the discharge time (e.g., 150 microseconds) to ensure that virtual ground is reached.

Once virtual ground is reached, the process running on MCU 405 can continue with resetting and starting the N-bit timer. However, the timer need not be reset. The process further includes commanding I/O port 1 from a low voltage state to a high impedance state. As such, capacitor 420 loads (charges) through resistor 415 towards $V_{cc}$. Given the above component values, the time constant to charge from virtual ground (e.g., at $t_0$) to $V_{cc}$ would be equal to the product of resistor 415 and capacitor 420, about 220 milliseconds. Those skilled in the art understand that the component values of the RC circuit depend on a number of factors including the desired time constants affecting both the charge and the discharge. The example values given, therefore, are not intended to limit the scope of the present invention.

As the RC circuit is loading, the process running on MCU 405 continues with monitoring the loading voltage at I/O port 1. This voltage is essentially the same voltage at the junction of resistor 410, resistor 415 and capacitor 420 as there is negligible current flow through resistor 410 due to the high impedance state of I/O port 1. While the RC circuit is charging, the N-bit timer of MCU 405 can be progressing through its range. For example, if the timer is an 8-bit timer, then it will cycle through binary counts ranging from 0 to 255 and then repeat or rollover. If the timer has a resolution of 4 microseconds per count, then the rollover period would be approximately 1.024 milliseconds (256 possible counts*4 microseconds). In this embodiment then, the rollover period is approximately one half a percent of the RC charging time constant. As such, while the RC circuit is charging towards Vcc, the timer is rolling over a number of times.

When the voltage at I/O port 1 reaches a certain threshold, the process running on MCU 405 includes reading the output value of its N-bit timer (or other secondary code generating event). This timer output value can be used as random identifier code 425. Alternatively, the timer output value can be used to seed a random identifier code generator algorithm stored in the ROM of MCU 405. Regardless, the resulting random identifier code 425 is stored, for example, in the RAM included in the MCU 405. The process running on MCU 405 further includes providing random identifier code 425 to physical layer 435, and embedding random identifier code 425 in the signals transmitted to receiver 441. Receiver 441 then receives and decodes the transmitted signals, identifies the random identifier code 425 and stores that code in, for example, the RAM of MCU 455. Alternatively, receiver 441 might have an EEPROM that MCU 455 can use to store random identifier code 425.

Tolerances associated with each of resistor 410, resistor 415, capacitor 420, Vcc, ground, the low voltage and high impedance states of I/O port 1 of MCU 405, the roll over period of the N-bit timer, and the threshold voltage that triggers the timer to be read all contribute to the incertitude of the timer output value that is ultimately read. The randomness of code 425 is derived from this incertitude. Additionally, multiple parts of a circuit can be used to generate the code. For example, eight bits of a twelve bit random identifier code can be generated with a N-bit timer as described above, while the remaining four bits of the random identifier code can be generated using the position data of the X and Y opto-couplers of a mouse circuit. The four bits read from the opto-couplers can be combined with the eight bits of the timer output value to form the twelve bit random identifier code.

Establishing Transmitter-Receiver Association with Random Identifier Code

The above discussion was relevant to generating a random identifier code to in accordance with one embodiment of the present invention. This section will discuss how the generated random identifier code can be used to establish an association between a transmitter and a receiver.

In general, transmitter 401 and receiver 441 are purchased together and from a transmitter-receiver pair. However, an association must be established between transmitter 401 and receiver 441 so that receiver 441 knows when it has received signals from transmitter 401. In this way, noise signals (signals from a source other than transmitter 401) received by receiver 441 can be distinguished from the desired signals (signals from transmitter 401). As such, only the desired signals are reported to computer 460. This association between transmitter 401 and receiver 441 can be established during the first power-up of the transmitter receiver pair.

Assume, for example, that receiver 441 has been plugged in to an electrical outlet, and transmitter 401 has had batteries installed. Those skilled in the art will appreciate that various other power schemes are available, and this example is not intended to limit the present invention. In one embodiment, the installation of the batteries into transmitter 401 triggers MCU 405 to generate random identifier code 425. This random identifier code 425 can then be stored, for example, in the RAM section of the MCU 405, and is embedded in the transmissions of the transmitter 401. Once receiver 441 is plugged in and receives the transmission with embedded random identifier code 425, it stores code 425 (e.g., in RAM of MCU 455), and transmitter 401 becomes associated or "married" with receiver 441.

Taking the batteries out of transmitter 401 may cause random identifier code 425 to be lost due to volatility associated with RAM. However, the design of transmitter 401 can also include a capacitor coupled between the supply voltage and ground of MCU 405. After the batteries have been removed, this capacitor will remain charged for a limited period of time (e.g., 10 minutes) with a supply voltage sufficient to sustain the RAM. This limited period of time allows for a quick battery change without losing the established random identifier code 425. If losing the code 425 is intended, the batteries can be left out for an extended period of time, or a discharge circuit can be employed to deplete the RAM sustaining capacitor charge. A new random identifier code 425 could then be generated upon the next power-up (or other code generating event) and the transmitter would once again be associated with the receiver.

In an alternative embodiment, both transmitter 401 and receiver 441 each include a "connect" button (not shown in FIG. 4a), wherein pressing the connect button triggers a certain action within the corresponding device. For example, pressing the connect button of transmitter 401 enables a broadcast of an random identifier code, while pressing the connect button of receiver 441 erases the currently stored random identifier code (if any) and enables another random identifier code to be written to memory. Thus, when the connect buttons are pressed simultaneously, the broadcasted random identifier code of transmitter 401 is received by receiver 441 and written to memory. As such, transmitter 401 and receiver 441 become associated or married based on the new random identifier code. Such a connect button scheme can also be used as a primary code generation mechanism wherein when the buttons are pressed simultaneously, a process for generating a random identifier code begins. In such an embodiment, a new random identifier code could be generated without having to use power up as the primary code generating event. However, the first random identifier code generated at power up can be used indefinitely. As such, a new random identifier code generally need not be generated unless so desired.

Those skilled in the art will appreciate that there are numerous ways to implement the techniques described above, and the present invention is not intended to be limited to the embodiment shown in FIG. 4a. Any circuit, as earlier discussed, produces signals associated with a level of incertitude resulting from component and signal tolerances that vary from one physical circuit to the next, despite those physical circuits having an identical design and layout. This incertitude of a circuit can be captured, manipulated and exploited to generate a random identifier code in accordance with the teachings disclosed herein.

Figure 4B:
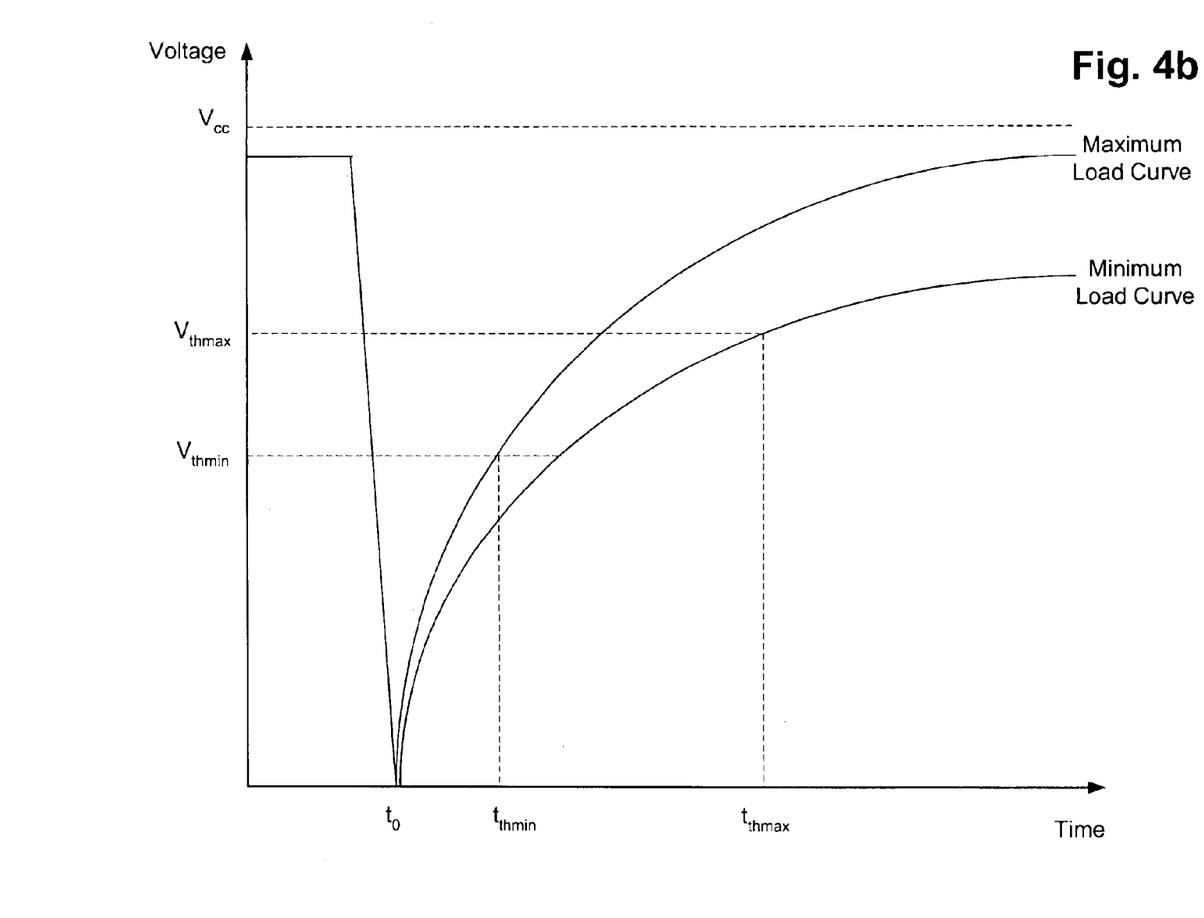

FIG. 4b illustrates an exemplar RC load curve of the exemplar system shown in FIG. 4a. As can be seen, the various tolerances involved in the circuit allow for a level of incertitude. Depending on the actual physical components used to build the system shown in FIG. 4a, the resulting RC load curve will be somewhere between (or equal to one of) the maximum load curve and the minimum load curve. Likewise, the resulting threshold voltage ($V_{th}$) that triggers the timer output value to be read will be somewhere between $V_{thmin}$ and $V_{thmax}$. As a result, the time allowed for charging to $V_{th}$ will be somewhere between $t_{thmin}$ and $t_{thmax}$. This incertitude associated with this loading time of the RC circuit in turn gives rise to a level of incertitude as to when the N-bit timer is actually read. Thus, randomization of the timer output value is achieved, and a random identifier code is generated.

Assume for the sake of discussion, that the RC time constant is approximately equal to 220 milliseconds, where R is approximately equal to 1 Megaohm and C is approximately equal to 220 nanofarads. The equation for calculating the loading voltage with respect to time would be: $Vcc(1-e^{-t/(RC)})$. Further, assume that Vcc is approximately equal to 5 volts, and that the desired threshold voltage ($V_{th}$) is approximately equal to one half of Vcc.

With these parameters in mind, solving the above loading voltage equation for t yields the loading time equation: $-RC\ LN\ (\frac{1}{2})$, wherein the resulting loading time is the time to charge from $t_0$ to $V_{th}$ (note—"LN" indicates a natural log function). $V_{thmin}$ and $V_{thmax}$ can be used in solving the above load equation for t to yield the respective values of $t_{thmin}$ and $t_{thmax}$. The actual $V_{th}$ can be reached anywhere between $t_{thmin}$ and $t_{thmax}$. Generally, the difference between $t_{thmin}$ and $t_{thmax}$ is greater than the roll over period of the timer. As such, the timer will roll over a number of times while the RC circuit is loading towards $V_{th}$. The inherent incertitude associated with such a scheme causes the resulting N-bit timer output values of various circuits of the same design to be random and evenly distributed. Other variables, such as temperature and any individual silicon process involved, further contribute to the randomness of the N-bit timer output value read. Thus, randomness of the random identifier code can be derived from software (e.g., an algorithm running in a MCU or other silicon process) or from hardware (e.g., circuit components such as an RC circuit, an N-bit timer, and or a noisy I/O port).

Figure 5:
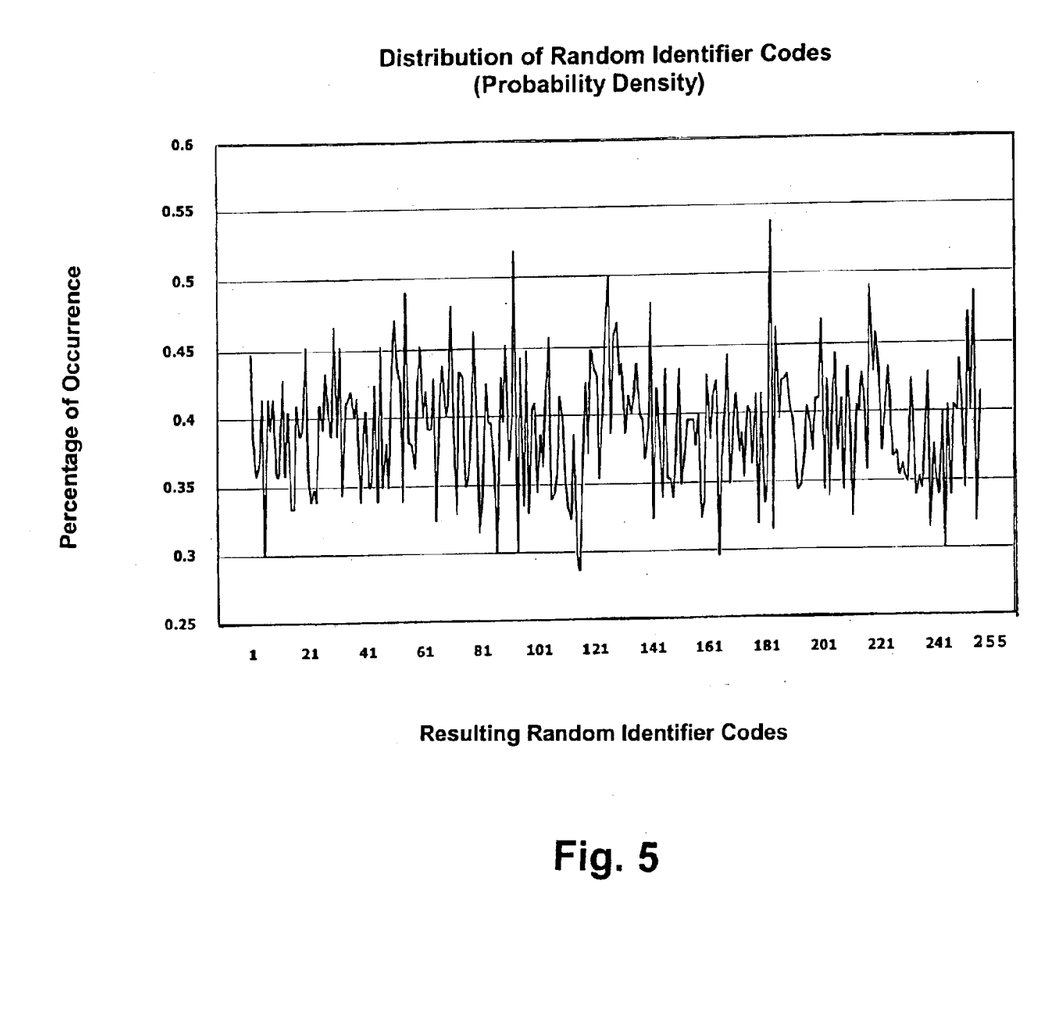
FIG. 5 is a graph illustrating the randomness of identifier codes generated in accordance with one embodiment of the present invention.

FIG. 5 is a graph illustrating the randomness of identifier codes generated in accordance with one embodiment of the present invention. The x-axis of the graph shows the resulting random identifier code values. As can be seen, the resulting codes range from 0 to 255. An 8-bit timer would produce codes in this range, for instance. The y-axis shows the percentage of code occurrence over a significant number of tries (e.g., greater than 20000 tries). As can be seen, there is an even distribution of random identifier code occurrences over the full range of the possible codes.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A wireless communications system comprising:
    a transmitter circuit for transmitting information and configured to generate a random identifier code having randomness that is derived from manufacturing tolerances associated with components included in the transmitter circuit, wherein the random identifier code is included in the transmitted information, the generation of the random identifier code being configured to repeatedly obtain a same result,
    wherein the transmitter circuit includes a microcontroller unit having a first input/output (I/O) port, wherein in response to detecting an event responsive to the manufacturing tolerances being detected at the first I/O port, a process running in the microcontroller unit generates the random identifier code.

2. The system of claim 1 wherein the microcontroller unit includes a read only memory (ROM) for storing a set of instructions for carrying out the process.

3. The system of claim 1 wherein the microcontroller unit includes a random access memory (RAM) for storing the random identifier code generated by the process.

4. The system of claim 1 wherein the microcontroller unit includes a N-bit timer having an output value that is read in response to the code generating event being detected at the first I/O port.

5. The system of claim 4 wherein the output value of the N-bit timer is the random identifier code.

6. The system of claim 4 wherein the output value of the N-bit timer is applied to a random code generator algorithm stored in a read only memory (ROM) of the microcontroller unit, the random code generator algorithm for generating the random identifier code.

7. The system of claim 1 wherein the transmitter circuit further includes a storage area for storing the random identifier code.

8. The system of claim 1 wherein the transmitter circuit is included in one of a wireless mouse, a wireless keyboard, a wireless joystick, a wireless trackball, a wireless video camera and a receiver unit for receiving communications of a wireless device.

9. A wireless communications system comprising:
    a transceiver circuit for transmitting information, and for generating a random identifier code having randomness that is derived from manufacturing tolerances associated with components included in the transceiver circuit, wherein the random identifier code is included in the transmitted information, the generation of the random identifier code being configured to repeatedly obtain a same result,
    wherein the transceiver circuit includes a microcontroller unit having a first input/output (I/O) port, wherein in response to detecting an event responsive to the manufacturing tolerances being detected at the first I/O port, a process running in the microcontroller unit generates the random identifier code.

10. The system of claim 9 wherein the microcontroller unit includes a read only memory (ROM) for storing a set of instructions for carrying out the process.

11. The system of claim 9 wherein the microcontroller unit includes a random access memory (RAM) for storing the random identifier code generated by the process.

12. The system of claim 9 wherein the microcontroller unit includes an N-bit timer having an output value that is read in response to the event being detected at the first I/O port.

13. The system of claim 12 wherein the output value of the N-bit timer is the random identifier code.

14. The system of claim 12 wherein the output value of the N-bit timer is applied to a random code generator algorithm stored in a read only memory (ROM) of the microcontroller unit, the random code generator algorithm for generating the random identifier code.

15. The system of claim 9 wherein the transceiver circuit further includes a storage area for storing the random identifier code.

16. The system of claim 9 wherein the transceiver circuit is included in one of a wireless mouse, a wireless keyboard, a wireless joystick, a wireless trackball, a wireless video camera and a receiver unit for receiving communications of a wireless device.

17. A method for distinguishing transmissions of a wireless transmitter, the method comprising:

generating a random identifier code having randomness that is derived from manufacturing tolerances associated with components included in the wireless transmitter, the generation of the random identifier code being configured to repeatedly obtain a same result; and embedding the random identifier code in the transmissions of the wireless transmitter, wherein the wireless transmitter includes a microcontroller unit having an input/output (I/O) port, and the generating step is in response to an event responsive to the manufacturing tolerances being detected at the I/O port.

18. The method of claim 17 further comprising:

storing the random identifier code in a storage area in the wireless transmitter.

19. The method of claim 17 wherein the microcontroller unit includes a read only memory (ROM) for storing a set of instructions, and the generating step is carried out pursuant to the instructions.

20. The method of claim 17 wherein the wireless transmitter is included in one of a wireless mouse, a wireless keyboard, a wireless joystick, a wireless trackball, a wireless video camera and a receiver unit for receiving communications of a wireless device.

21. A method for distinguishing transmissions of a transceiver included in a wireless communications system, the method comprising:

generating a random identifier code having randomness that is derived from manufacturing tolerances associated with components included in the transceiver; and embedding the random identifier code in the transmissions of the transceiver, the generation of the random identifier code being configured to repeatedly obtain a same result, wherein the wireless transmitter includes a microcontroller unit having an input/output (I/O) port, and the generating step is in response to an event responsive to the manufacturing tolerances being detected at the I/O port.

22. The method of claim 21 further comprising:

storing the random identifier code in a storage area in the wireless transmitter.

23. The method of claim 21 wherein the microcontroller unit includes a read only memory (ROM) for storing a set of instructions, and the generating step is carried out pursuant to the instructions.

24. The method of claim 21 wherein the transceiver is included in one of a wireless mouse, a wireless keyboard, a wireless joystick, a wireless trackball, a wireless video camera and a receiver unit for receiving communications of a wireless device.

25. A computer-readable medium having instructions stored thereon which, when executed by a processor included in a wireless communications system, when executed by a processor included in a wireless communications system, cause the processor to perform the steps of:

in response to an event responsive to manufacturing tolerances associated with components included in the communications system, receiving data produced by the wireless communications system, wherein the received data has randomness that is derived from the manufacturing tolerances associated with the components included in the wireless communications system;

generating a random identifier code based on the received data; and storing the random identifier code in a storage area included in the wireless communications system, the generation of the random identifier code being configured to repeatedly obtain a same result.

26. The computer-readable medium of claim 25, wherein the steps performed by the processor further comprise:

embedding the random identifier code in transmissions of the wireless communications system.

27. The computer-readable medium of claim 25 wherein the wireless communications system includes a microcontroller unit having an I/O port, and the event is detected at the I/O port.

28. A method for distinguishing transmissions of a wireless communications device, wherein the wireless communications device has a microcontroller unit having an input/output (I/O) port coupled to a resistor capacitive (RC) circuit having an output voltage that can be monitored by the I/O port, the method comprising:

responsive to a triggering event, commanding the I/O port of the microcontroller unit from a high impedance state to a low voltage state thereby discharging the RC circuit;

resetting and starting an N-bit timer of the microcontroller unit, the N-bit timer having an output;

commanding the I/O port from the low voltage state to the high impedance state thereby charging the RC circuit;

monitoring the output voltage of the RC circuit at the I/O port;

responsive to the output voltage at the I/O port reaching a threshold voltage, reading the output of the N-bit timer;

generating from the read output of the N-bit timer a random identifier code; and embedding the random identifier code in transmissions of the wireless communications device.

* * * * *